United States Patent
Bellows et al.

(10) Patent No.: US 9,703,998 B2
(45) Date of Patent: Jul. 11, 2017

(54) RECONFIGURABLE RFID ANTENNA ASSEMBLY UTILIZING A COMMON REFLECTOR CODE

(71) Applicant: SYMBOL TECHNOLOGIES, INC., Schaumburg, IL (US)

(72) Inventors: David E. Bellows, Wantagh, NY (US); Rehan K Jaffri, New York, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 346 days.

(21) Appl. No.: 14/461,500

(22) Filed: Aug. 18, 2014

(65) Prior Publication Data

US 2016/0048713 A1    Feb. 18, 2016

(51) Int. Cl.
    *G06K 7/10*      (2006.01)
    *G06K 7/00*      (2006.01)
    (Continued)

(52) U.S. Cl.
    CPC ....... *G06K 7/10356* (2013.01); *G06K 7/0008* (2013.01); *G06K 7/10009* (2013.01); *H01Q 1/007* (2013.01); *H01Q 1/08* (2013.01); *H01Q 1/1207* (2013.01); *H01Q 1/2216* (2013.01); *H01Q 5/307* (2015.01); *H01Q 7/00* (2013.01);
    (Continued)

(58) Field of Classification Search
    CPC ............. G06K 7/10356; G06K 7/0008; G06K 7/10009; H01Q 5/307; H01Q 1/007; H01Q 1/08; H01Q 1/1207; H01Q 7/00; H01Q 7/02; H01Q 15/14; H01Q 19/106; H01Q 21/0087; H01Q 21/205
    See application file for complete search history.

(56) References Cited

U.S. PATENT DOCUMENTS

| 6,211,834 B1 | 4/2001 | Durham et al. |
| 6,903,656 B1 * | 6/2005 | Lee ...................... G06K 7/0008 340/10.1 |

(Continued)

FOREIGN PATENT DOCUMENTS

WO     20140043401 A1     3/2014

OTHER PUBLICATIONS

International Search Report and Written Opinion mailed Oct. 14, 2015 in counterpart PCT application PCT/US2015/043372.

*Primary Examiner* — James Yang
(74) *Attorney, Agent, or Firm* — Yuri Astvatsaturov

(57) ABSTRACT

A reconfigurable Radio Frequency Identification (RFID) antenna assembly utilizing a common reflector core includes a plurality of antennas, wherein each antenna consists of: a first replaceable antenna element, at least one first replaceable standoff, and a reflector panel, which is configured for a lowest operable frequency of the antenna assembly. The reflector panels of all the plurality of antenna elements are connected together to form a common reflector core housing within the antenna elements disposed outside of the housing. The first replaceable antenna element, the first replaceable standoffs, and the common reflector core are configured for a first operating frequency of the antenna assembly. The first replaceable antenna elements and first replaceable standoffs are replaceable on the common reflector core with second replaceable antenna elements and second replaceable standoffs operable at a second frequency.

10 Claims, 5 Drawing Sheets

(51) Int. Cl.
- *H01Q 1/12* (2006.01)
- *H01Q 5/307* (2015.01)
- *H01Q 15/14* (2006.01)
- *H01Q 7/00* (2006.01)
- *H01Q 21/00* (2006.01)
- *H01Q 1/00* (2006.01)
- *H01Q 1/08* (2006.01)
- *H01Q 1/22* (2006.01)
- *H01Q 7/02* (2006.01)
- *H01Q 19/10* (2006.01)
- *H01Q 21/20* (2006.01)

(52) U.S. Cl.
CPC ............. *H01Q 7/02* (2013.01); *H01Q 15/14* (2013.01); *H01Q 19/106* (2013.01); *H01Q 21/0087* (2013.01); *H01Q 21/205* (2013.01)

(56) References Cited

U.S. PATENT DOCUMENTS

| | | | |
|---|---|---|---|
| 7,965,242 B2 | 6/2011 | Abramov et al. | |
| 2006/0125638 A1 | 6/2006 | Marino | |
| 2012/0169552 A1* | 7/2012 | Lee ........................ | H01Q 9/285 343/727 |
| 2013/0207856 A1 | 8/2013 | Oon | |
| 2014/0054378 A1 | 2/2014 | Bellows | |

* cited by examiner

RECONFIGURABLE RFID ANTENNA ASSEMBLY UTILIZING A COMMON REFLECTOR CODE

BACKGROUND

Radio Frequency Identification (RFID) is utilized in a variety of applications with RFID readers interrogating RFID tags for purposes of identification, location, tracking, and the like. However, a single RFID reader in a large room will not be able to read all the RFID tags. Therefore, in an exemplary RFID application, an RFID reader is equipped with a plurality of antenna elements, each pointed in a different direction. Moreover, the RFID reader can be mounted overhead (e.g., ceiling mounted). The overhead configuration offers several advantages such as fewer physical obstructions, ease of access to wiring in a ceiling, tamper resistance, safety, and the like. In this way a single RFID reader can read a large amount of RFID tags within an enterprise, such as in a retail environment, a factory environment, a warehouse environment, etc.

A problem arises when RFID functionality is needed in different locations that require different operating configurations. For example, different RFID reader configurations are needed for North America and the European Union. In North America, the RIFD reader must be configured with RFID antennas operable in a range of 902-928 MHz, whereas in the European Union, the RIFD reader must be configured with RFID antennas operable in a range of 865-868 MHz. It is strongly desired to keep as much common between the two configurations so that the RFID reader can be manufactured in a way that can easily accept either antenna configuration.

Accordingly, there is a need for an RFID reader that can be manufactured in a way that overcomes the aforementioned limitations. It would be beneficial to provide this overhead system in a small, lightweight arrangement that can be reconfigured at a low cost.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
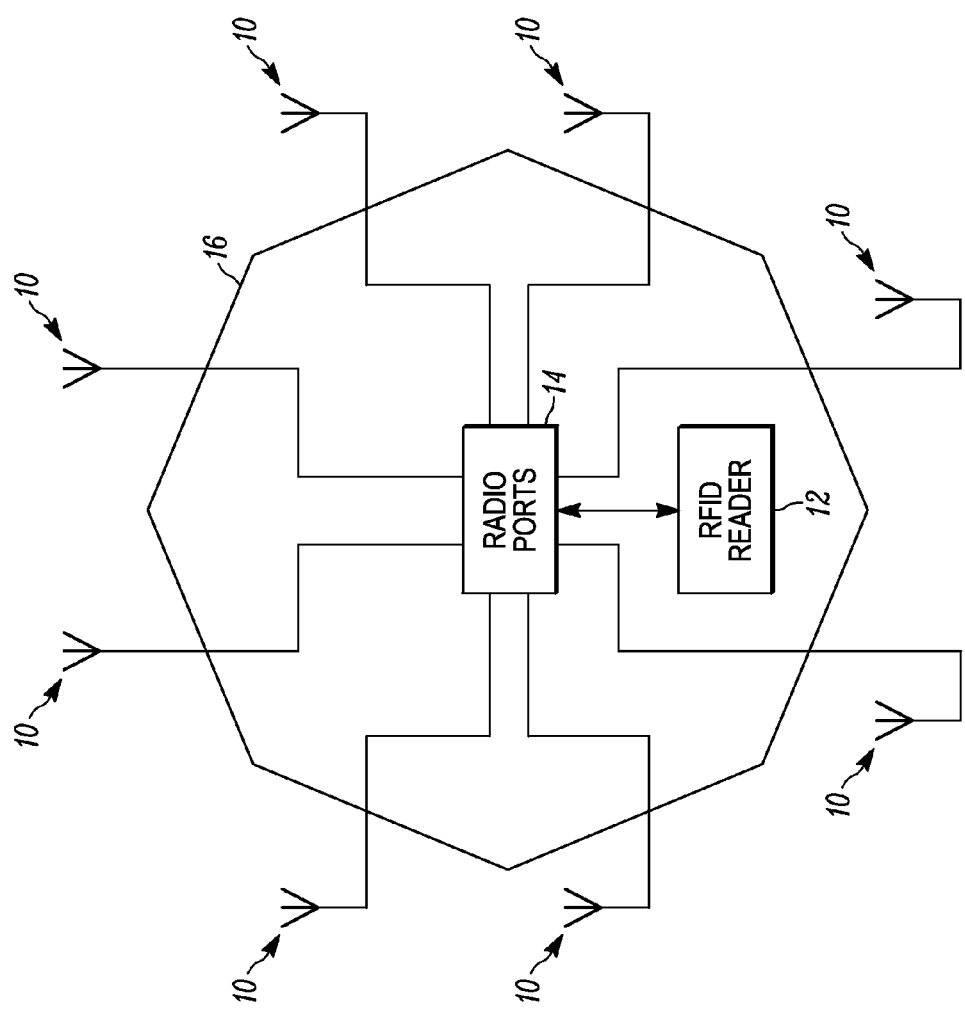
FIG. 1 is a simplified block diagram of a general RFID reader and antenna arrangement, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, the present invention provides a reconfigurable Radio Frequency Identification (RFID) antenna assembly utilizing a common reflector core and method. In general, an RFID reader is provided using a multiple (e.g. eight) switchable antenna elements. In practice, the antenna elements are alternating linearly polarized loop antennas positioned in front of a central common reflector core. Since the eight antennas are arranged in a circle, with the loops facing outward, the central reflector forms a three-dimensional electrically grounded reflector core. By sizing this reflector core to support the lower European Union frequency RFID band, the core will also be properly sized (with a resulting margin) to work at the higher frequency North American RFID band. The size of the loops and their spacing from this reflector core are easily varied geometric parameters and have a direct result on the antennas' frequency tuning, gain, and pattern. By simply adjusting these two parameters, two RFID readers for two different markets can be created where the same common reflector core itself does not change. The present invention also provides an overhead system in a small, lightweight, low cost arrangement, where the physical size of the reader is kept to a minimum so that the system is unobtrusive, easy to install, integrate, synchronize, and maintain, and can allow for other features, such as a video camera, access point electronics, etc.

FIG. 1 illustrates a block diagram of a portion of RFID reader electronics in an RFID reader assembly 16, in accordance with some embodiments of the present invention. The RFID reader has an array of (eight) multiple antennas 10 arranged in a circular pattern around the reader and positioned outside of a housing encompassing the RFID reader. The RFID reader 12 is communicatively coupled to the antenna elements 10 by providing an RF feed thereto via the radio ports 14. Only one antenna on the reader is active at a time. The active antenna will read tags until its specified dwell time is reached, after which the next antenna in the array will be selected to read RFID tags.

The RFID reader can be integrated with an access point (not shown) and can direct the different radio ports to sequentially communicatively connect only one antenna element at a time to the RFID reader such that only one antenna element is operable to transmit/receive at any instant in time. The RFID reader can provide any information it obtains from an RFID tag to an access point (not shown) that can be wired or RF wirelessly connected to a local area network (not shown) for inventory purposes, for example. Although eight antenna elements are shown, there could be any number of elements. Preferably, there is an even number of antenna elements arranged in a circle to radiate outwardly from the circle and have alternating polarizations. The polarizations of the antenna elements are not limited to linear and alternating but can also be dual or circular on every antenna element. As shown in this embodiment, there are eight antenna elements evenly disposed at 45 degree intervals of the circle and connected to an eight-port radio.

The housing 16 of the RFID reader can further enclose electronics and RF components for operation of the antenna arrangement. For example, the electronics and components may include electrical connectivity to the antenna feeds for transmission and reception of radio frequency signals. The housing may further enclose electronics and the like for operation of the RFID reader as well as other components as described herein. In accordance with the present invention, the antenna elements 10 are interchangeable to allow the RFID reader to operate on different frequencies.

Figure 2:
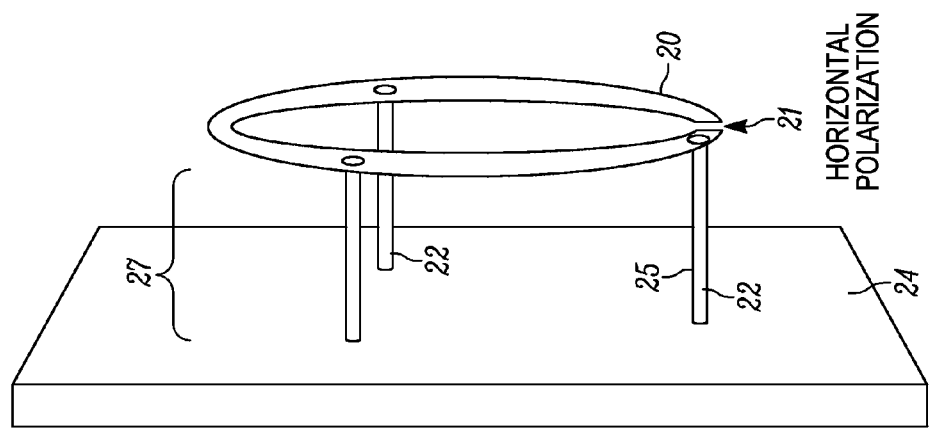
FIG. 2 is a perspective view of isolated linearly polarized antenna elements, in accordance with some embodiments of the present invention.
Figure 2:
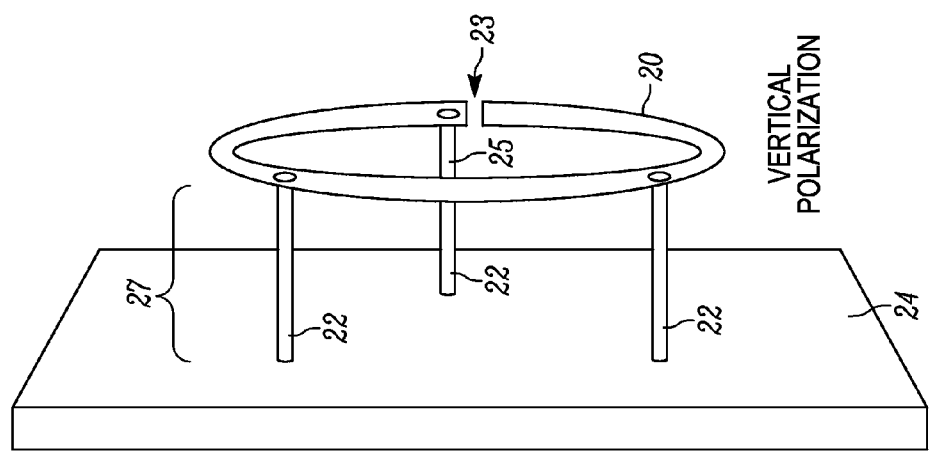

Referring to FIG. 2, in one embodiment, each antenna element 10 includes a linearly polarized, full wavelength loop as the driven element 20 that is oriented parallel to a reflector panel 24, wherein the loop element is fed by an RF signal at a specific point. The loop geometry of the driven element can be different than what is shown in the exemplary embodiment—as examples, the size can be larger or smaller, the shape does not have to be a circle, the width of the loop does not need to be constant, etc. Also, the reflector panel may have holes cut out. Furthermore, the geometric details of the loop and reflector do not necessarily have to be the same for both antenna polarizations. The loop element mounts using any number of standoffs 22 between the loop element 20 and the reflector panel 24. In addition, the loop element may be a thin film deposited on a dielectric plate (not shown), which can serve as a structural piece for mounting to the standoffs.

Ultimately, the physical shape, size, and configuration of the antenna geometry should be resonant at 915 MHz, which is a standard frequency for RFID applications.

In accordance with the present invention, the antenna elements are linearly polarized to provide either of a horizontal or vertical polarization. In particular, half of the antenna elements have the horizontal polarization and half have the vertical polarization, but note the antenna elements could also be dual polarized or circularly polarized. In one embodiment, the feed point of the vertical polarization is at point 23 (or opposite point 23). In this case the feed point could be driven by a conductive trace 25 on one of the standoffs 22. Note that the feed point could alternatively be driven by a coaxial cable. The feed point of the horizontal polarization is at point 21 (or opposite point 21). Again, the feed point could be driven by a conductive trace 25 on one of the standoffs 22. In accordance with the present invention, the horizontal and vertical polarized antenna elements are positioned around a circle (as shown in FIG. 1) wherein the antenna elements alternate polarizations around the circle, e.g. a vertically polarized antenna element has two neighboring horizontally polarized antenna elements, and vice versa.

In the example shown in FIG. 2, using the standoffs 22, the loop element 20 has a spacing 27 of about ⅙ wavelength to 1/10 wavelength from the reflector panel 24, which is about 3.3 centimeters to 5.4 centimeters for a 915 MHz system, which is a standard frequency for US RFID applications, and about 3.5 centimeters to 5.8 centimeters for a 867 MHz system, which is a standard frequency for European Union RFID applications. It should be noted that spacing 27 does not necessarily have to be the same for both antenna polarizations. The reflector panel is approximately 205 centimeters squared in area, while the loop antenna is electrically approximately one wavelength in circumference, which is about 33 centimeters for a 915 MHz system and about 34 centimeters for a 867 MHz system. It should be noted that these values are approximate, and they could all be varied to affect a different antenna gain, frequency, or radiation pattern. It should also be noted that the reflector panel(s) are illustrated herein in a substantially square shape, but those of ordinary skill in the art will recognize other shapes are also contemplated. The use of a reflector panel placed behind the loop antenna and having a parallel spacing thereto helps to reflect back most of the RF energy, making the antenna element a high gain antenna system. The reflector panel takes energy that is directed backwards towards it from the loop element and redirects it, combining it with the directly radiated pattern that was already directed forward. The result is a high gain, directional antenna.

The configuration shown in FIG. 2 provides 6 dB antenna gain along its bore sight (perpendicular to the plane of the loop), which equates to 4 watts of radiated power from a 1 watt transmitter in the RFID reader. It should be recognized that completely different antenna element configurations can be used successfully in the present invention, other than the embodiment shown, to provide a substantially linear polarization, including, but not limited to, a partial loop antenna, a Yagi antenna, a slot antenna, a dipole antenna, a monopole antenna, and the like. It should be recognized that a Yagi antenna, a slot antenna, a dipole antenna, a monopole antenna, and the like can be modified in size and shape while still electrically behaving as a respective Yagi antenna, slot antenna, dipole antenna, a monopole antenna, and the like tuned to the proper RFID frequency band.

The present invention utilizes a plurality of the linearly polarized antenna elements of FIG. 2, arranged in a circle (FIG. 1 showing eight elements arranged in a circle) and alternating the polarization of each antenna to achieve 360 degrees of coverage. In this arrangement, the reflector panels are all joined together to form a grounded common reflector core. The system turns each antenna on and off individually, switching from one antenna to the next, so only one antenna is transmitting/receiving at any instant in time. In one embodiment, there are eight antennas spaced at 45 degree intervals, with their linear polarizations alternating from horizontal to vertical to horizontal, etc. The antennas have a gain of 6 dB, which corresponds to a 3 dB (half power) beamwidth of about 93 degrees. In other words, each antenna element provides an antenna gain that is down 3 dB from its 6 dB peak at about ±46.5 degrees from its bore sight, such that RFID read coverage areas of neighboring antenna elements slightly overlap. The actual radiation patterns can be affected by the configuration of the loop and reflector plate for each element, and by the nature of mounting each antenna element together in a circle. In accordance with the present invention, the dimensions of the standoffs and the configuration of the loop elements can be changed between different operating frequencies while the common reflector core remains unchanged.

Figure 3:
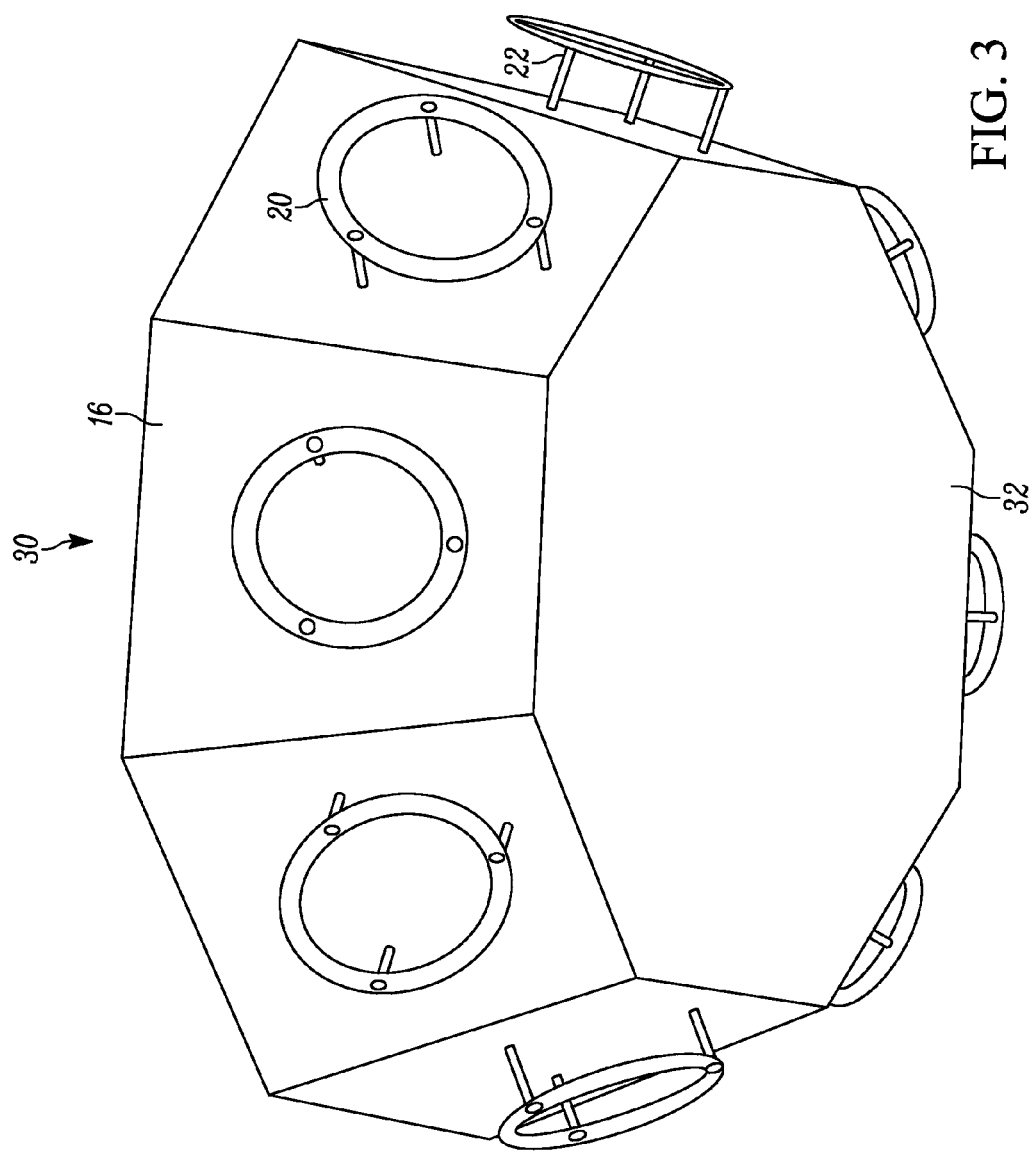
FIG. 3 is a bottom perspective view of the RFID reader of FIG. 1 utilizing a common reflector core.

FIG. 3 shows a bottom perspective view of an eight element antenna assembly of the present invention from FIG. 1. The particular antenna polarizations are not shown for the sake of simplicity. All the reflector panels 24 of the antenna elements are joined together, along with a conductive top 30 and bottom 32, to create a central metal box or housing 16 that is a trapezoidal pyramidal section with planar surfaces, and that acts as one common reflector core for all the antenna loop elements 20 as well as an electrical ground for the other system electronics located inside the housing. The central housing 16 can alternatively be a continuous conical surface, as opposed to the faceted embodiment shown in FIG. 3. The configuration shown results in an overall maximum dimension of about 48 centimeters wide and about 18 centimeters tall with the housing portion having a maximum dimension of about 38 centimeters wide. The dimension of the antenna loop elements 20 and the length of the standoffs 22 can be changed to change the operating frequency range of the RFID reader. Therefore, only these two easily changed parameters are needed to reconfigure the operating frequency of the antenna assembly.

Accordingly, the present invention provides a reconfigurable RFID antenna assembly utilizing a common reflector core 16. In particular, the present invention includes a plurality of antennas 10, wherein each antenna consists of: a first replaceable antenna element 20, at least one first replaceable standoff 22, and a reflector panel 24, which is preferably flat and is configured for a lowest operable frequency of the antenna assembly. Preferably, the antenna elements are loop antennas, wherein dimensions of the loop elements and a length of the standoffs are configured for their respective operating frequency.

The reflector panels 24 of all the plurality of antenna elements are connected together to form the common reflector core housing 16 with the antenna elements 20 disposed outside of the housing 16. Preferably, the common reflector core is also joined with a conductive top and bottom to form a grounded, three-dimensional, enclosed housing configured to enclose electronic circuitry therein, and with the antenna elements disposed to radiate outwardly from the housing.

The first replaceable antenna element, the first replaceable standoffs, and the common reflector core are configured for a first operating frequency of the antenna assembly. The first replaceable antenna elements and first replaceable standoffs are replaceable on the common reflector core with second replaceable antenna elements and second replaceable standoffs operable at a second frequency. Preferably, the loop antennas are spaced parallel to a respective flat portion of the reflector core using the associated standoffs.

In practice, the first frequency is lower than the second frequency, where the first frequency is a lowest operable frequency of the antenna assembly, and wherein the reflector panel of the antennas is configured for this lowest operable frequency. In particular, by sizing this reflector core to support the lower European Union frequency RFID band, the reflector core will also be properly sized (within a resulting margin) to work at the higher frequency North American RFID band. The size of the loop elements and their spacing from this reflector core are easily varied geometric parameters and have a direct result on the antennas' frequency tuning, gain, and radiation pattern. By simply adjusting the two parameters of loop size and standoff length, the antenna assembly can be built in a way that can easily accept either antenna configuration, where the reflector core itself does not change, making for easier and lower cost manufacturing.

Utilizing a common reflector core is important because it allows the factory to build up the majority of the antenna assembly without having to know its final configuration or where it will be deployed, such as in North America or the European Union. Because the antenna elements are arranged towards the outside of the product, they are one of the last items to be assembled. The North American assembly will have one prescribed set of antenna element spacing and loop dimensions, and the European Union antenna elements can utilize a different spacing and loop geometry. The factory can use this simple differentiation to customize the assembly at the end of manufacturing. In the prior art, traditional antenna designs would replace the entire antenna assembly, but in the present invention, half of the antenna is the common reflector core which does not need to be replaced, making the assembly flow easier and lower cost.

Figure 4:
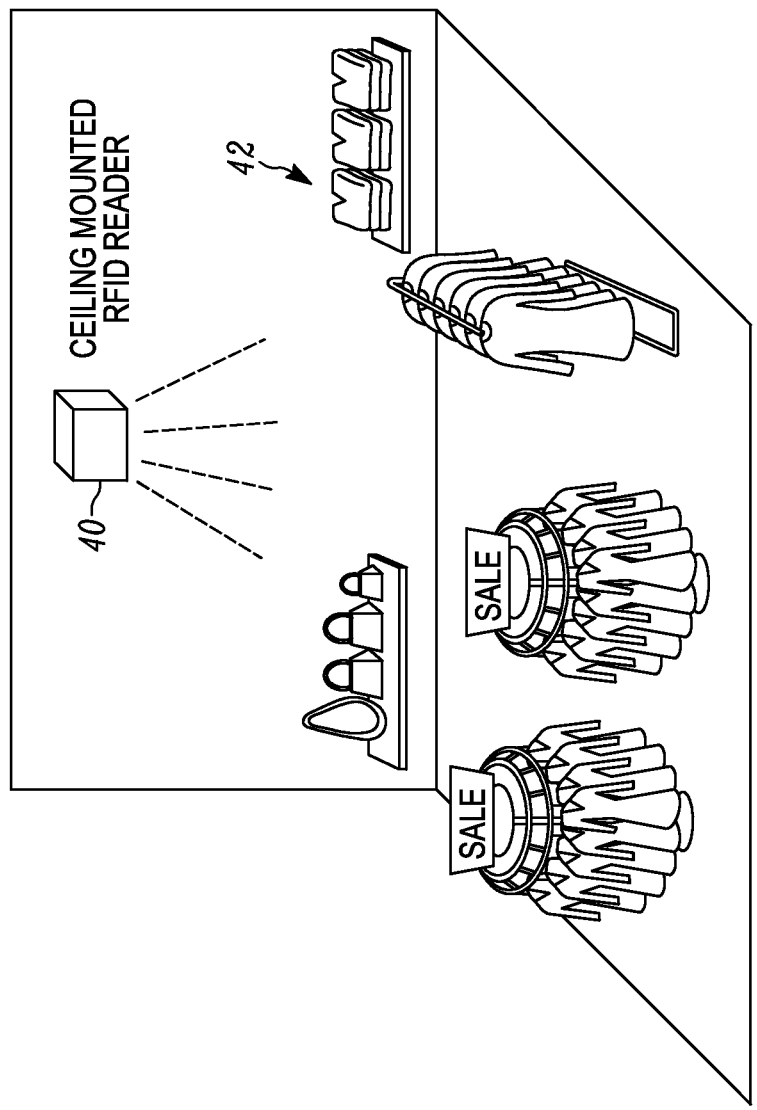
FIG. 4 is a perspective view of an example environment utilizing the RFID reader of FIG. 1.

FIG. 4 is a perspective diagram of an exemplary retail environment with an RFID reader 40 using the RFID antenna arrangement of the present invention in a ceiling-mounted overhead configuration. The RFID reader 40 is configured to wirelessly interrogate a plurality of RFID tags located on or affixed to a plurality of items 42. The RFID reader 40 may be mounted to a ceiling or other overhead fixture in the retail environment. The retail environment is shown solely for illustration purposes, and the RFID antenna may be used in any environment including warehouse, manufacturing facility, file room, storage area, and the like.

The RFID reader 40 of the present invention includes a common reflector core housing enclosing the wireless radios of the RFID reader disposed therein and communicatively coupled to a re-configurable antenna arrangement driven by a common RF feed thereto via the radio ports. The housing can also enclose associated electronics for providing RFID reader functionality. The housing may further include a camera and an access point coupled to or integrated with the RFID reader. The RFID reader including the re-configurable antenna arrangement is disposed to operate in an overhead configuration with respect to a plurality of RFID tags. The multiple antenna elements are configured to provide a radiation pattern covering at least a portion of the floor of the environment.

In general, the RFID reader is configured to provide communication between the RFID reader and RFID tags. For example, the RFID reader "interrogates" RFID tags, and receives signals back from the tags in response to the interrogation. The reader is sometimes termed as "reader interrogator" or simply "interrogator". In an exemplary embodiment, the RFID reader may include, without limitation one or more of: a processor, a communication module, memory, a camera, and the re-configurable antenna arrangement. The elements of the RFID reader may be interconnected together using a communication bus or another suitable interconnection arrangement that facilitates communication between the various elements of RFID reader. It should be appreciated that the above description depicts the RFID reader in an oversimplified manner and a practical embodiment can include additional components and suitably configured processing logic to support known or conventional operating features that are not described in detail herein for the sake of brevity.

The RFID reader is controlled by one or more processors to interrogate the RFID tags of the items. The housing can further enclose electronics and RF components for operation of the re-configurable antenna arrangement. For example, the electronics and components may include electrical connectivity to the antenna feeds for transmission and reception of radio frequency signals of the proper frequency band. The housing may further enclose electronics and the like for operation of the RFID reader as well as other components as described herein. The housing is defined by the joined reflector panels of all the antenna elements to form an enclosed grounded case. The electronics, components, etc. may be disposed or located behind the reflector panels within the housing.

The processor may be any microprocessor, application specific integrated circuit (ASIC), field programmable gate array (FPGA), digital signal processor (DSP), any suitable programmable logic device, discrete gate or transistor logic, discrete hardware components, or combinations thereof that has the computing power capable of managing the RFID reader 10. The processor generally provides the software, firmware, processing logic, and/or other components of the RFID reader 10 that enable functionality of the RFID reader.

The RFID reader can also include a communication module including components enabling the RFID reader to communicate on a wired or wireless network. For example, the communication module may include an Ethernet interface to communicate on a local area network. The communication module can be compliant to IEEE 802.11 and variants thereof). Additionally, the RFID reader may include other wireless technologies such as, but are not limited to: RF; IrDA (infrared); Bluetooth; ZigBee (and other variants of the IEEE 802.15 protocol); IEEE 802.11 (any variation); IEEE 802.16 (WiMAX or any other variation); Universal Mobile Telecommunications System (UMTS); Code Division Multiple Access (CDMA) including all variants; Global System for Mobile Communications (GSM) and all variants; Time division multiple access (TDMA) and all variants; Direct Sequence Spread Spectrum; Frequency Hopping Spread Spectrum; wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

The RFID reader can also include a memory including any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory can incorporate electronic, magnetic, optical, and/or other types of storage media. Note that the memory can have a distributed architecture, where various components are situated remotely from one another, but can be accessed by the processor. The memory may be utilized to store data associated with RFID interrogations, the camera, etc. The camera may include any device for capturing video, audio, photographs, etc.

Figure 5:
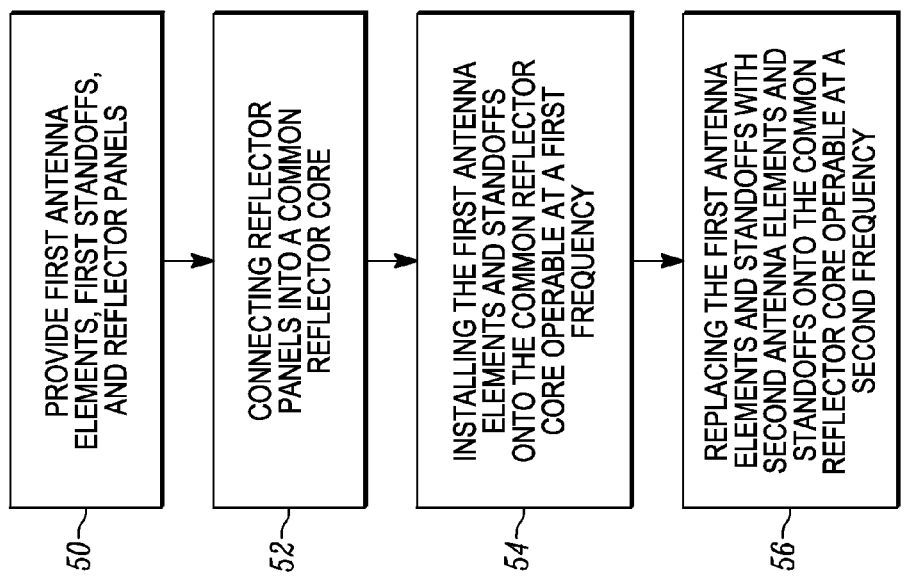
FIG. 5 shows a flowchart of a method, in accordance with some embodiments of the present invention.

Referring to FIG. 5, the present invention describes a method for reconfiguring a Radio Frequency Identification (RFID) antenna assembly utilizing a common reflector core. A first step 50 includes providing a plurality of antennas, wherein each antenna consists of: a first replaceable antenna element, at least one first replaceable standoff, and a reflector panel, which is preferably flat and is configured for a lowest operable frequency of the antenna assembly. Also preferably, the antenna elements are loop antennas, wherein dimensions of the loop elements and a length of the standoffs are configured for their respective operating frequency.

A next step 52 includes connecting the reflector panels of all the plurality of antenna elements together to form a common reflector core housing within the antenna elements disposed outside of the housing. Preferably, the common reflector core is also joined with a conductive top and bottom to form a grounded, three-dimensional, enclosed housing configured to enclose electronic circuitry therein, and with the antenna elements disposed to radiate outwardly from the housing.

A next step 54 includes installing the first replaceable antenna element and the first replaceable standoffs to the common reflector core, wherein the first replaceable antenna element, the first replaceable standoffs, and the common reflector core are configured for a first operating frequency of the antenna assembly. Preferably, the loop antennas are spaced parallel to a respective flat portion of the reflector core using the associated standoffs.

A next step 56 includes replacing the first replaceable antenna elements and first replaceable standoffs with second replaceable antenna elements and second replaceable standoffs on the common reflector core, wherein the second replaceable antenna elements, second replaceable standoffs, and common reflector core are operable at a second frequency.

Advantageously, the use of a common reflector core is important because it allows a factory to build up the majority of the RFID reader without knowing its final destination and whether a North American or European Union customer will be deploying it. Because the antenna elements are arranged towards the outside of the product, they are one of the last items to be assembled. The North American antenna elements will have one prescribed set of element spacing and loop dimensions, and the European Union antenna elements can utilize a different spacing and loop geometry. The factory can use this simple differentiation to customize the RFID reader at the end of assembly. Traditional antenna designs would replace the entire antenna assembly along with the reflector, but in this case, half of the antenna is the actual reflector core and does not need to be replaced, making the assembly flow much less costly.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A reconfigurable Radio Frequency Identification (RFID) antenna assembly utilizing a common reflector core, comprising:
   a plurality of antennas, wherein each antenna consists of:
   a first replaceable antenna element,
   at least one first replaceable standoff, and
   a reflector panel, wherein
   reflector panels of all the plurality of antennas are connected together to form a common reflector core housing with respective first replaceable antenna elements disposed outside of the common reflector core housing, wherein
   the first replaceable antenna element and the at least one first replaceable standoff, of each of the plurality of antennas, and the common reflector core housing, are configured for a first operating frequency of the antenna assembly, and wherein
   the first replaceable antenna element and the at least one first replaceable standoff, of each of the plurality of antennas, are replaceable on the common reflector core housing with second replaceable antenna elements and second replaceable standoffs operable at a second operating frequency,
   wherein the first replaceable antenna element, of each of the plurality of antennas, comprise a loop antenna, and the reflector panel, of each of the plurality of antennas, is flat, and wherein dimensions of the loop antenna and a length of the least one first replaceable standoff, of each of the plurality of antennas, are configured for a respective operating frequency of the first operating frequency and the second operating frequency, and wherein the loop antenna, of each of the plurality of antennas, is spaced parallel to a respective flat portion of the common reflector core housing using associated standoffs.

2. The antenna assembly of claim 1, wherein the common reflector core housing is grounded and configured to enclose electronic circuitry therein.

3. The antenna assembly of claim 2, wherein the common reflector core housing is joined with a conductive top and bottom to form an enclosed housing.

4. The antenna assembly of claim 1, wherein the first operating frequency is lower than the second operating frequency.

5. The antenna assembly of claim 1, wherein the first operating frequency is a lowest operable frequency of the antenna assembly, and wherein the reflector panel, of each of the plurality of antennas, is configured for the lowest operable frequency.

6. The antenna assembly of claim 1, wherein the common reflector core housing forms a central three-dimensional reflector core, with the first replaceable antenna element, of each of the plurality of antennas, is disposed to radiate outwardly therefrom.

7. A Radio Frequency Identification (RFID) reader incorporating a reconfigurable Radio Frequency Identification (RFID) antenna assembly utilizing a common reflector core, comprising:
   an RFID reader;
   a plurality of radio ports coupled to the RFID reader; and
   a plurality of antennas, wherein each antenna consists of:
   a first replaceable antenna element,
   at least one first replaceable standoff, and
   a reflector panel, wherein
   reflector panels of all the plurality of antennas elements are connected together to form a common reflector core housing with respective first replaceable antenna elements disposed outside of the common reflector core housing, wherein
   the first replaceable antenna element and the at least one first replaceable standoff, of each of the plurality of antennas, and the common reflector core housing, are configured for a first operating frequency of the antenna assembly, and wherein
   the first replaceable antenna element and the at least one first replaceable standoff, of each of the plurality of antennas, are replaceable on the common reflector core housing with second replaceable antenna elements and second replaceable standoffs operable at a second operating frequency,
   wherein the first replaceable antenna element, of each of the plurality of antennas, comprise a loop antenna, and the reflector panel, of each of the plurality of antennas, is flat, and wherein dimensions of the loop antenna and a length of the least one first replaceable standoff, of each of the plurality of antennas, are configured for a respective operating frequency of the first operating frequency and the second operating frequency, and wherein the loop antenna, of each of the plurality of antennas, is spaced parallel to a respective flat portion of the common reflector core housing using associated standoffs.

8. A method for reconfiguring a Radio Frequency Identification (RFID) antenna assembly utilizing a common reflector core, the method comprising:
providing a plurality of antennas, wherein each antenna consists of:
a first replaceable antenna element,
at least one first replaceable standoff, and
a reflector panel;
connecting reflector panels of all the plurality of antennas together to form a common reflector core housing with respective antenna elements disposed outside of the common reflector core housing;
installing the first replaceable antenna element and the at least one first replaceable standoff, of each of the plurality of antennas, to the common reflector core housing, wherein the first replaceable antenna element, the at least one first replaceable standoff, of each of the plurality of antennas, and the common reflector core housing are configured for a first operating frequency of the antenna assembly; and
replacing the first replaceable antenna element and the at least one first replaceable standoff, of a portion of the plurality of antennas, with second replaceable antenna elements and second replaceable standoffs on the common reflector core housing, wherein the second replaceable antenna elements, second replaceable standoffs, and common reflector core housing are operable at a second operating frequency,
wherein the providing includes the first replaceable antenna element, of each of the plurality of antennas, being a loop antenna, and the reflector panel, of each of the plurality of antennas, being flat, and wherein dimensions of the loop antenna and a length of the least one first replaceable standoff, of each of the plurality of antennas, are configured for a respective operating frequency of the first operating frequency and the second operating frequency, and wherein the installing includes the loop antenna, of each of the plurality of antennas, being spaced parallel to a respective flat portion of the common reflector core housing using associated standoffs.

9. The method of claim 8, wherein the providing includes configuring the reflector panel, of each of the plurality of antennas, for a lowest operable frequency of the antenna assembly.

10. The method of claim 8, wherein the connecting includes the common reflector core housing being also joined with a conductive top and bottom to form a grounded, three-dimensional, enclosed housing configured to enclose electronic circuitry therein, and with the first replaceable antenna element, of each of the plurality of antennas, disposed to radiate outwardly from the enclosed housing.

* * * * *